US008340700B2

(12) United States Patent
Modin

(10) Patent No.: US 8,340,700 B2
(45) Date of Patent: Dec. 25, 2012

(54) ENABLING BINARY OBJECT ATTACHMENT SUPPORT FOR SHORT MESSAGING SERVICE

(75) Inventor: Niklas Modin, Oakland, CA (US)

(73) Assignee: Oracle International Corporation, Redwood Shores, CA (US)

( * ) Notice: Subject to any disclaimer, the term of this patent is extended or adjusted under 35 U.S.C. 154(b) by 579 days.

(21) Appl. No.: 12/493,062

(22) Filed: Jun. 26, 2009

(65) Prior Publication Data

US 2010/0331020 A1 Dec. 30, 2010

(51) Int. Cl.
*H04W 4/00* (2009.01)
(52) U.S. Cl. .................... 455/466; 455/414.1; 455/428; 455/418; 709/206
(58) Field of Classification Search .................. 455/466, 455/414.1, 428, 418; 370/466, 469, 467, 370/401; 709/209
See application file for complete search history.

(56) References Cited

U.S. PATENT DOCUMENTS

| 6,246,871 B1 * | 6/2001 | Ala-Laurila | 455/413 |
| 7,548,756 B2 * | 6/2009 | Velthuis et al. | 455/466 |
| 8,068,860 B1 * | 11/2011 | Midkiff | 455/466 |
| 2004/0029598 A1 * | 2/2004 | Guggisberg | 455/466 |
| 2004/0092272 A1 * | 5/2004 | Valloppillil | 455/466 |
| 2007/0006327 A1 * | 1/2007 | Lal et al. | 726/31 |
| 2008/0022110 A1 * | 1/2008 | Hung | 713/176 |
| 2008/0070607 A1 * | 3/2008 | Song | 455/466 |
| 2010/0151819 A1 * | 6/2010 | D'Englere | 455/406 |
| 2010/0159962 A1 * | 6/2010 | Cai et al. | 455/466 |

OTHER PUBLICATIONS

Short Message Peer to peer protocol Specification v3.4 Oct. 12, 1999 issue 1.2.*

* cited by examiner

*Primary Examiner* — Kamran Afshar
*Assistant Examiner* — Yousef R Rod
(74) *Attorney, Agent, or Firm* — Fliesler Meyer LLP

(57) ABSTRACT

Systems and methods are described for enabling binary object attachment support in a short messaging service (SMS). More specifically, a binary SMS exposure service is described that allows for sending any generic binary content via SMS to the telecom network. The binary SMS exposure service includes an application-facing web services interface and a network-specific protocol interface. The binary attachment sent via SMS can represent any object, such as an electronic business card, an encrypted token, and the like. Applications are enabled to poll for the delivery status of a message sent using the exposure service, as well as receive asynchronous notifications for messages that have been sent. In addition, a specific use case is described wherein an encrypted binary object attachment is transmitted via SMS to an automobile in order to perform a specified function thereon.

20 Claims, 5 Drawing Sheets

US 8,340,700 B2

ENABLING BINARY OBJECT ATTACHMENT SUPPORT FOR SHORT MESSAGING SERVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to telecommunications and the short messaging service (SMS) and more particularly to transmitting binary objects as attachments to SMS messages.

BACKGROUND

Given the recent dramatic growth in wireless and cellular communications, more and more businesses and other entities are integrating themselves with mobile device technologies. In addition to standard voice features, modern cellular phones and similar devices provide countless other services, such as internet access, email, short messaging service (SMS) texting, digital cameras, multimedia messaging service (MMS), Bluetooth, gaming, various web-based applications and the like. As a result, telecommunication carriers and network operators have been under increased pressure to provide more and more service offerings to their subscribers. Today's network operator wants to attract new and retain customers, develop profitable new business models, improve returns and launch new services as quickly as possible. In addition, the possible competitive pressures from other entities such as internet-based providers have been a growing area of concern in this field.

Faced with these challenges, most operators expect a drastic increase in their portfolio of content and application offerings, from a handful now, to thousands and possibly even millions in the future. While some of these offerings will be developed and deployed in house, the vast majority of these new applications will likely be sourced from partners, Web applications such as social networking sites and third party service providers. These outsourced services will be deployed and executed outside of the carrier's internal network, thereby creating new challenges in security, integration and management of the environment.

To assist with these challenges, new telecommunication gateways and software applications have emerged, which are typically deployed by the network operator as part of a service development platform (SDP). These gateways usually provide features for managing the ecosystem between the operator, its internal subscriber network and various third party providers. For example, a communication services gateway may help to secure third party access to the operator's core network, provide service level agreement (SLA) enforcement, as well as perform numerous other functions.

These service access gateways have greatly simplified the management and control of accessing the telecom network by various third party service providers. However, there still exists significant room for improvement in terms of new features and functions for entities wishing to access the telecom network and provide new service offerings to its various end-users.

SUMMARY OF INVENTION

In the present disclosure, systems and methods are described for enabling binary object attachment support in a short messaging service (SMS). More specifically, a binary SMS exposure service is described that allows for sending any generic binary content via SMS to the telecom network. The binary SMS exposure service includes an application-facing web services interface and a network-specific protocol interface. In one embodiment, the binary SMS exposure service is deployed on a service access gateway positioned between an operator's telecom network and the various external service provider applications. Third party applications are thus allowed to access a simple web services based interface and to send a binary SMS message to a network, without requiring knowledge of the network-specific protocols used to send such SMS messages.

The binary attachment sent via SMS can represent any object, such as an electronic business card, an encrypted token, and the like. Applications are enabled to poll for the delivery status of a message sent using the exposure service, as well as receive asynchronous notifications for messages that have been sent.

In addition, a specific use case is described wherein an encrypted binary object attachment is transmitted via SMS to an automobile in order to perform a specified function thereon.

DETAILED DESCRIPTION

Figure 1:
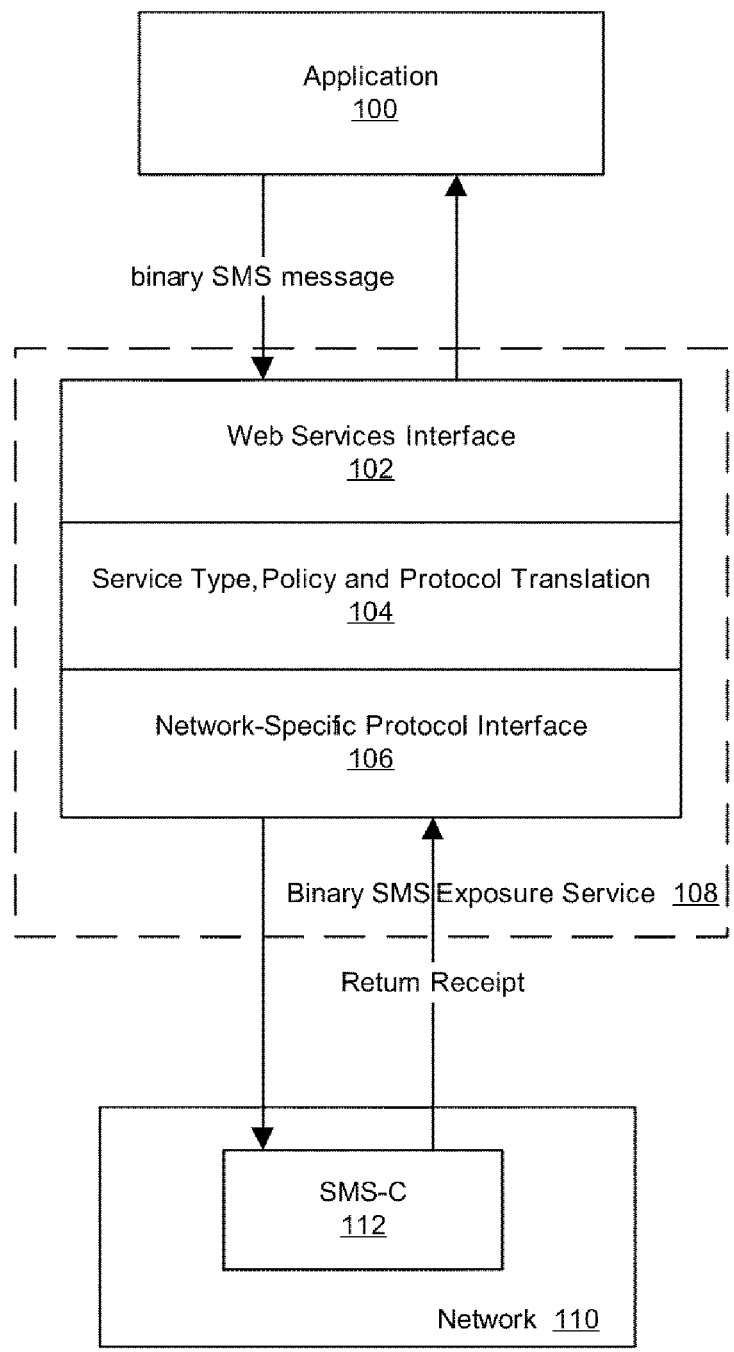
FIG. 1 is an illustration of an SMS binary traffic path, in accordance with various embodiments of the invention.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a server or a router. Furthermore, it can also be apparent to those skilled in the art that such components, regardless of how they are combined or divided, can execute on the same computing device or can be distributed among different computing devices connected by one or more networks or other suitable communication means.

In accordance with the embodiments of the invention, systems and methods are described for enabling binary object support for a short messaging service (SMS). More specifically, an SMS traffic path is described that exposes specific network SMS functions as a generic web service interface to application developers. This traffic path allows an application to send various binary objects as attachments to a short text message transmitted through the mobile subscriber network. For example, a v-card or an encrypted key can be transmitted as binary data via SMS. Applications can also poll for the delivery status of a message sent using the interface, as well as receive asynchronous notifications for messages that have been sent.

In addition, a specific use case is described wherein the binary object attachment can be transmitted via SMS to an automobile in order to perform a function thereon. For example, a binary encrypted token can be sent to an automobile from a central control center in order to unlock the door or perform some other action.

In various embodiments, the SMS traffic path can be preferably implemented in a service access gateway positioned between an operator's network and various external third party applications. In this manner, the developer of the third party application is allowed to access the exposed web services without specific internal telecommunications network knowledge. The service access gateway can be deployed by a network operator in order to manage access to its internal subscriber network by external third party applications and service providers. As a non-limiting example, a web application may wish to send and receive text messages as part of providing a voting service. In many cases, this (or other) web application may not be provided by the network operator but may instead be deployed externally with respect to the operator. In such situations, it can be important for the operator to securely manage and control access of such third party applications by implementing a service access gateway.

The SMS traffic path can be implemented as an exposure service within the service access gateway. The exposure service is a basic functional unit of the gateway and is comprised of an application-facing web service interface, a service type and a network element-facing protocol interface. A request enters the traffic path through one interface, is subjected to internal processing, including evaluation for policy and protocol translation, and is then sent on using the other interface. Thus, in the case of the binary SMS traffic path, a request specifying a binary object is received via the application facing interface, is subjected to protocol translation logic and then passed to the network element as a binary SMS message in the network-specific protocol (e.g. SMPP network protocol).

Binary SMS messages can be sent to one or more destination addresses. The actual message element is made up of an array of user data header (UDH) and message parts, encoded in Base 64. The contents of the UDH and the message can be of any binary data, although in certain embodiments, the byte array may need to be less than 140 bytes due to short message peer-to-peer protocol (SMPP) limitations.

Send receipts can be returned to the application synchronously. In one embodiment, a send receipt is an acknowledgement that the network node has received the short message from the application by means of the gateway. In one embodiment, the receipt is returned by the gateway in the response message to the sendBinarySms operation.

Delivery receipts can be returned to the application asynchronously. In one embodiment, the delivery of receipt can be accomplished using the Parlay X short messaging interface.

FIG. 1 is an illustration of an SMS binary traffic path, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the binary SMS exposure service 108 is comprised of an application-facing interface 102 (e.g. web services type interface) and a network-specific protocol interface 106 (e.g. SMPP v3.4 network protocol). The SMS exposure service further includes the protocol translation logic and policy enforcement components 104.

An SMS message containing binary content is received from an external application 100 via the web services interface 102. Once the message is received, various policies are enforced (e.g. budget enforcement on the third party application or service provider), the message is translated into the network-specific protocol and sent on to a network node 112 of the operator's network 110.

As a non-limiting illustration, the interface 102 can have the following definition:

| Parameter | Type | Optional | Description |
| --- | --- | --- | --- |
| addresses | xsd:anyURI[1 ... unbounded] | No | An array of target device addresses. Example: tel: 1234 |
| senderName | xsd:string | Yes | The address of the sender. Example: tel: 7485 |
| dcs | xsd:byte | No | Data code schema, according to network-specific protocol (e.g. SMPP v3.4) |
| binaryMessage | binary_sms_xsd:BinaryMessage[1 ... unbounded] | No | An array comprised of UDH (according to 3GPP 23.040 6.5.0) and message elements, encoded in Base64 |

| Parameter | Type | Optional | Description |
|---|---|---|---|
| | | | transparently through xsd:base64Binary. The purpose of interface is to give the application the flexibility to manipulate the SMPP UDH and message data. Both UDH and message elements are optional, while the binaryMessage itself is required. |
| protocolId | xsd:byte | Yes | The protocol identifier according to 3GPP 23.040 6.5.0. The protocol identifier is the information element by which the SM TL either refers to the higher layer protocol being used, or indicates interworking with a certain type of telematic device. Example: 123. |
| validityPeriod | xsd:string | Yes | The validity period according to 3GPP 23.040 6.5.0. |
| charging | ews_common_xsd:ChargingInformation | Yes | Charging information, defined according to Parlay X ChargingInformation |
| receiptRequest | ews_common_xsd:SimpleReference | Yes | Receipt request for holding callback service URL, etc. |

Figure 2:
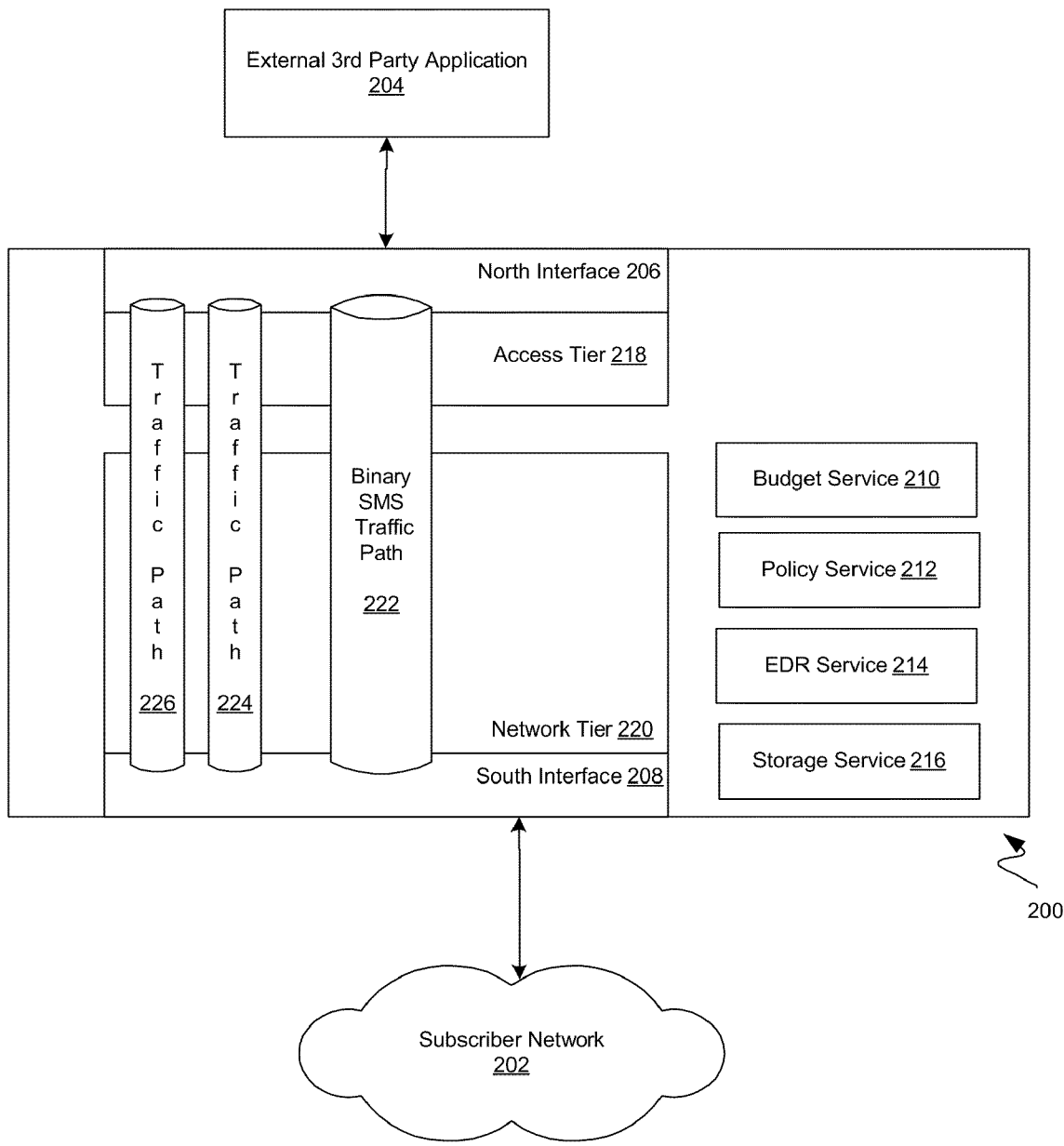
FIG. 2 is an illustration of an SMS binary traffic path deployed within a service access gateway, in accordance with various embodiments of the invention.

FIG. 2 is an illustration of an SMS binary traffic path deployed within a service access gateway, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the gateway 200 can be an entity deployed by the network operator to control and manage access to the subscriber network 202 by various third party applications 204. The gateway can include a number of traffic paths (exposure services) 222, 224, 226 as well as various services for enforcing budgets 210, policy 212, generating event data records (EDRs) 214 and storing state 216 and other types of data.

In one embodiment, the gateway can be deployed in two tiers—an access tier 218 and a network tier 220. The stateless access tier can serve as an entry point for (possibly un-trusted) third party applications into the network. The network tier which integrates with the internal network can be shielded from the applications by the access tier.

The binary SMS exposure service 222 can receive requests from an application via the application facing "north" interface 206 and can relay the request in the network-specific "south" interface 208 to the subscriber network 202. More specifically, the exposure service 222 receives a request to transmit an SMS message containing binary data via interface 206, translates the request into a network specific protocol and forwards the request to a network element (e.g. SMS-C).

Figure 3:
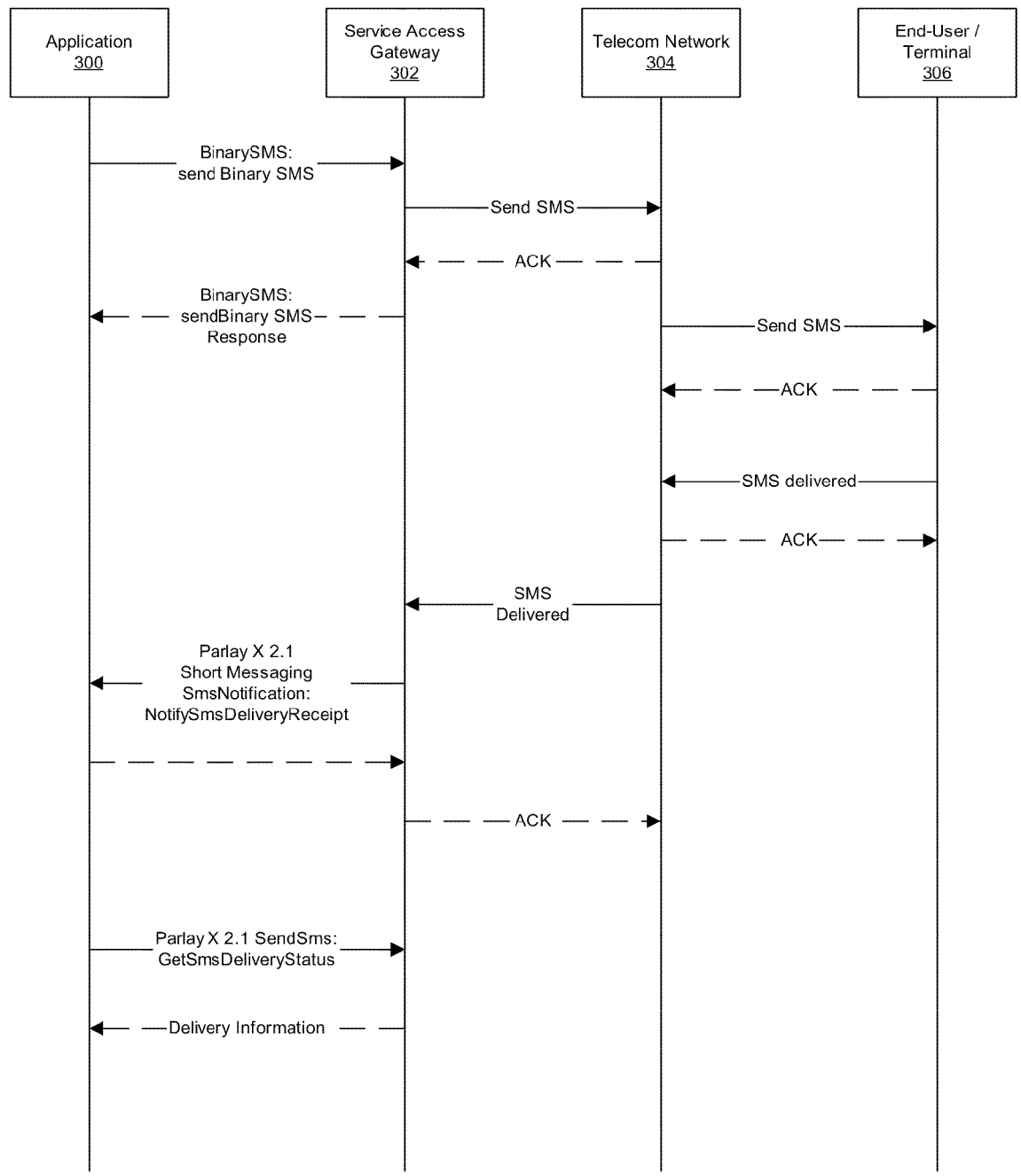
FIG. 3 is a sequence diagram illustration showing the general message sequence for sending a binary SMS message using the exposure service in accordance with various embodiments of the invention.

FIG. 3 is a sequence diagram illustration showing the general message sequence for sending a binary SMS message using the exposure service in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As illustrated, an application 300 invokes a send Binary SMS method on the interface provided by the service access gateway 302. The gateway 302 can forward the binary SMS request to the telecom network node and receive an acknowledgment (ACK) in return. The gateway can then return a binary SMS response to the application.

Continuing with the illustration, the network node 304 can send the SMS message to the end user or terminal 306 and receive an acknowledgment in return. Additionally, the network may receive an SMS delivery message which it can relay to the gateway. Once the gateway 302 receives the SMS delivered message, it can send a delivery receipt in the Parlay X protocol back to the application that initiated the binary SMS.

In addition, the application 300 is able to obtain the delivery status of the previously sent binary SMS from the gateway by using the Parlay X web services get SMS delivery status method.

Figure 4:
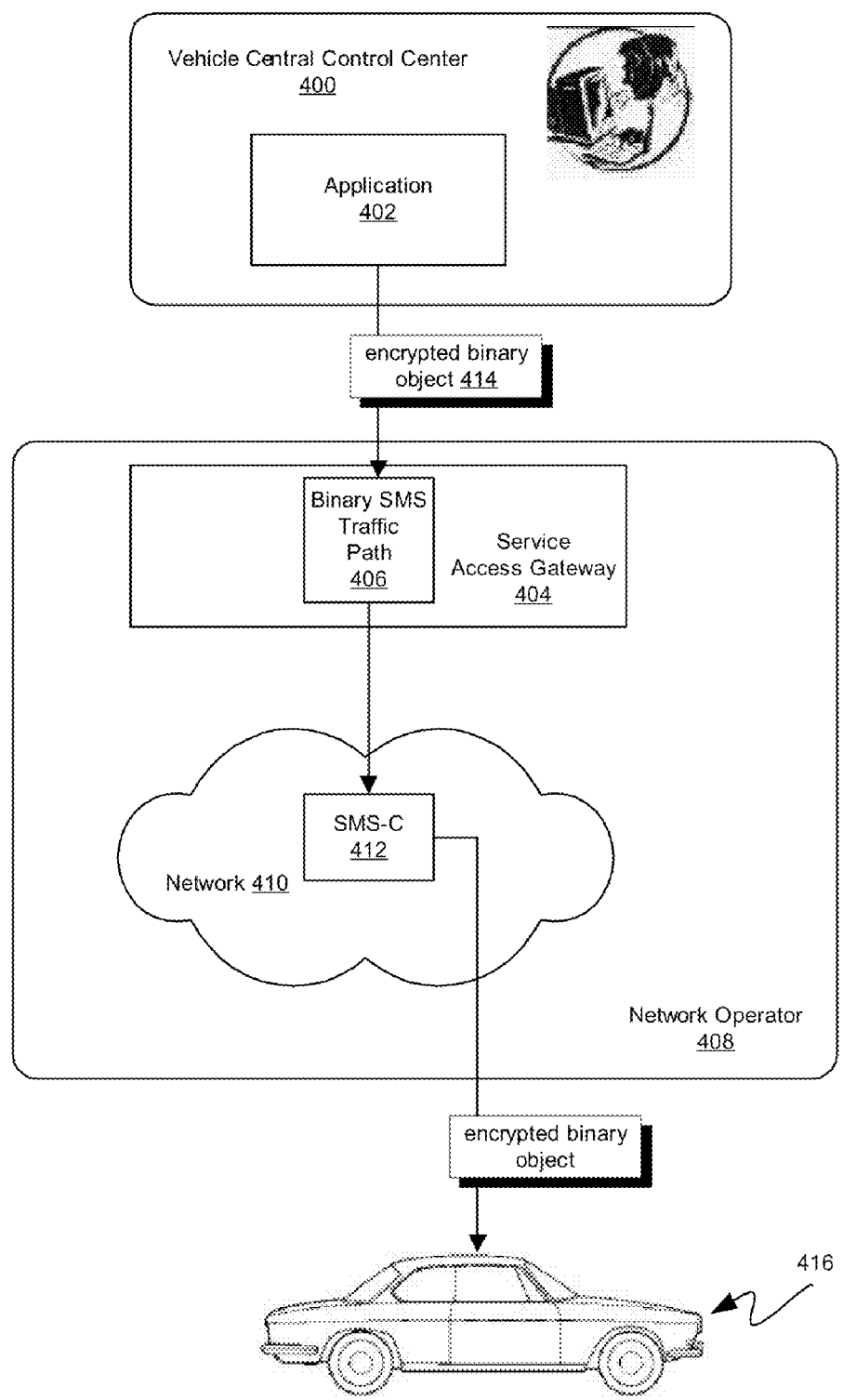
FIG. 4 is an illustration of a possible use case of the binary SMS feature, in accordance with various embodiments of the invention.

FIG. 4 is an illustration of a possible use case of the binary SMS feature, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, one possible application 402 can be deployed by a vehicle central control center 400. Such control centers are common in the automobile marketplace and are typically responsible for monitoring emergency situations, road service response and communications, turn-by-turn navigation, remote vehicle diagnostics as well as providing functions to the driver, such as unlocking the vehicle. The application 402 can be for example a web application that allows a control center representative to open a car door, report on a particular malfunction with the vehicle, or perform some other function.

In one embodiment, the application 402 can initiate an SMS message containing an encrypted binary object 414 by accessing the SMS traffic path 406 on the gateway 404 provided by the network operator 408. The SMS traffic path can apply protocol translation logic and pass the message along to a network node, such as a short message service center (SMS-C) 412 within the network 410, which can in turn relay the binary object to a recipient. As illustrated in the example, the recipient can be a cellular receiver unit in an automobile 416, which receives the binary object and decrypts it. Once decrypted, the object is processed and the on-board vehicle computer can perform a particular function specified by the binary object, such as unlocking the door of the vehicle, rendering a v-card (electronic business card), displaying a message, and the like.

Figure 5:
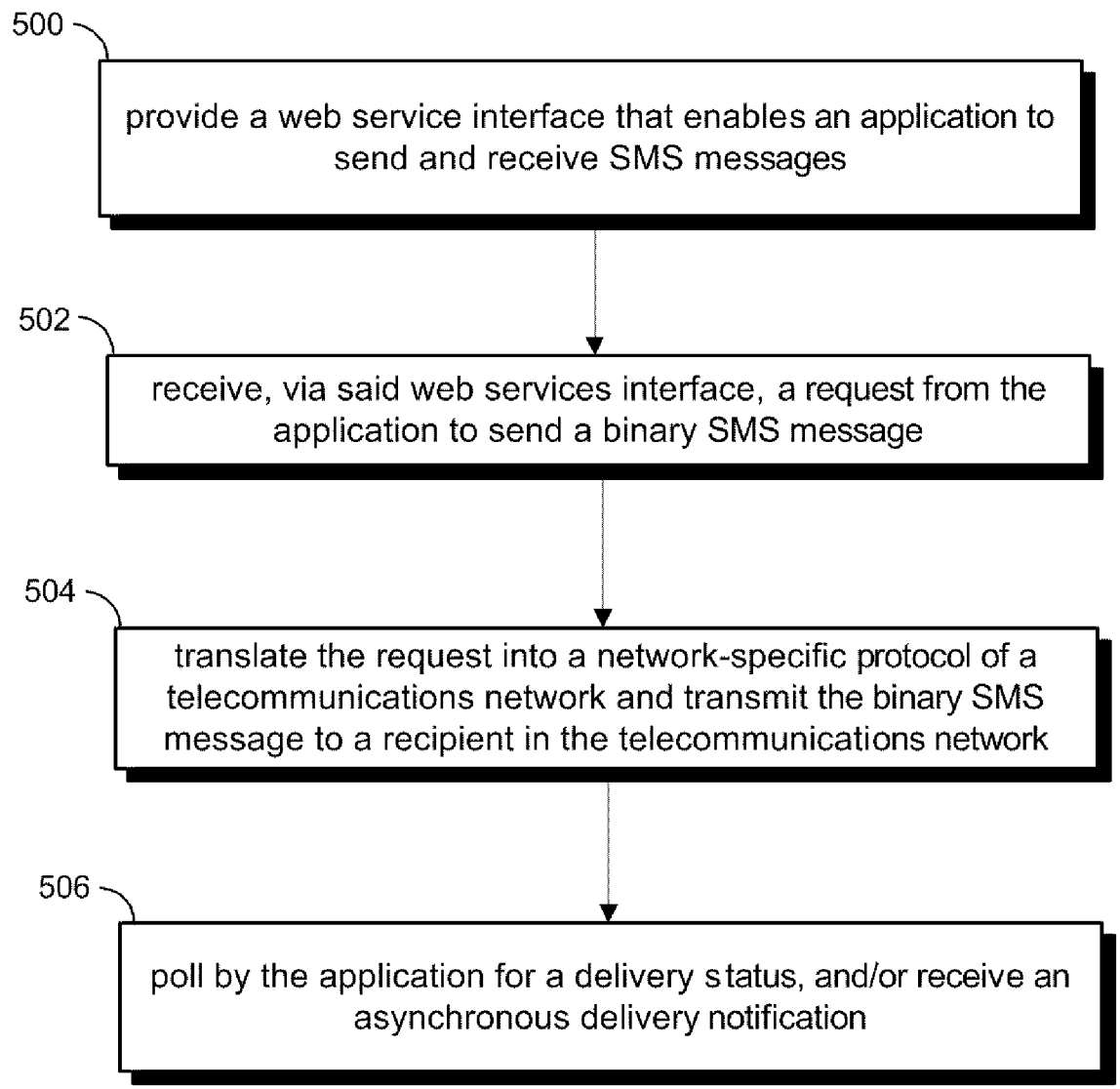
FIG. 5 is a flow chart diagram of a process for using the binary SMS messages, in accordance with various embodiments of the invention.

FIG. 5 is a flow chart diagram of a process for using the binary SMS messages, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 500, a web services interface is provided to an application, which enables the application to send and receive SMS messages. In step 502, a request is received from the application via the interface, specifying an SMS text message. The SMS text message includes a binary object as an attachment. In step 504, the request is translated into a network-specific protocol of a telecommunications network and transmitted to a recipient in said telecommunications network. For example, the binary SMS message can be sent to an SMS-C node and be further relayed to an end-user.

In step 506, the application can poll the gateway for a delivery status of the binary SMS message. Alternatively, the application can receive an asynchronous delivery receipt notification from the network via the gateway.

In various aspects, the embodiments described throughout this disclosure encompass computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments also include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for remotely requesting a vehicle to perform a function via binary object attachments in a short messaging service (SMS), said system comprising:
   a telecommunications network that includes one or more network elements;
   a service provider application that accesses the network elements, said service provider application residing externally with respect to the telecommunications network; and
   an interface at a gateway in the telecommunications network, wherein the interface is accessed by the service provider application to send and receive SMS messages, wherein an SMS message that includes a binary object attachment is received by the gateway from the service provider application, translated into a telecommunications network protocol and transmitted to a recipient connected to the telecommunications network;
   wherein said binary object attachment specifies the function to be performed;
   wherein the vehicle is the recipient and includes a receiver to receive said SMS message including the binary object attachment; and
   wherein the vehicle receives and processes said binary object attachment, and performs the function specified.

2. The system of claim 1, wherein the vehicle is an automobile and said binary object attachment is encrypted.

3. The system of claim 2, wherein the automobile receives the encrypted binary object attachment, decrypts and processes said binary object, and performs the function specified by the encrypted binary object.

4. The system of claim 1, wherein the application polls for a delivery status of the SMS message using said interface.

5. The system of claim 1, wherein the application receives an asynchronous delivery notification after having transmitted said SMS message.

6. The system of claim 1, wherein the interface used to specify the SMS message further includes one or more of the following:
   an array of addresses, a sender name, a data code schema, a binary message array, a protocol identifier, a validity period, charging information, a receipt request and a result.

7. A method for remotely requesting a vehicle to perform a function via binary object attachments in a short messaging service (SMS), said method comprising:

providing a web services interface that enables an application to send and receive SMS messages;

receiving at a gateway in a telecommunications network, via said web services interface, a request from the application to send an SMS text message, said SMS text message including a binary object as an attachment; and translating the request at the gateway into a telecommunications network protocol of the telecommunications network and transmitting the SMS text message including the binary object to a recipient in said telecommunications network;

wherein said binary object attachment specifies the function to be performed;

wherein the vehicle is the recipient and includes a receiver to receive said SMS message including the binary object attachment; and wherein the vehicle receives and processes said binary object attachment, and performs the function specified.

8. The method of claim 7, further comprising:
encrypting the binary object attachment.

9. The method of claim 1, wherein the vehicle is an automobile.

10. The method of claim 9, wherein the automobile receives an encrypted binary object attachment, decrypts and processes said binary object, and performs the function specified by the encrypted binary object.

11. The method of claim 7, further comprising:
polling, by said application, for a delivery status of the SMS message using said interface.

12. The method of claim 7, further comprising:
receiving, by said application, an asynchronous delivery notification after said application has transmitted the SMS message.

13. The method of claim 7, wherein the interface used to specify the SMS message further includes one or more of the following:
an array of addresses, a sender name, a data code schema, a binary message array, a protocol identifier, a validity period, charging information, a receipt request and a result.

14. A non-transitory computer-readable storage medium carrying one or more sequences of instructions for remotely requesting a vehicle to perform a function via binary object support in a short messaging service, which instructions, when executed by one or more processors, cause the one or more processors to carry out the steps of:

providing a web services interface that enables an application to send and receive SMS messages;

receiving at a gateway in a telecommunications network, via said web services interface, a request from the application to send an SMS text message, said SMS text message including a binary object as an attachment; and translating the request at the gateway into a telecommunications network protocol of the telecommunications network and transmitting the SMS text message including the binary object to a recipient in said telecommunications network;

wherein said binary object specifies the function to be performed;

wherein the vehicle is the recipient and includes a receiver to receive said SMS message including the binary object; and wherein the vehicle receives and processes said binary object, and performs the function specified.

15. The non-transitory computer-readable storage medium of claim 14, further comprising instructions for:
encrypting the binary object attachment.

16. The non-transitory computer-readable storage medium of claim 14, wherein the vehicle is an automobile.

17. The non-transitory computer-readable storage medium of claim 16, wherein the automobile receives an encrypted binary object attachment, decrypts and processes said binary object, and performs the function specified by the encrypted binary object.

18. The non-transitory computer-readable storage medium of claim 14, further comprising instructions for:
polling, by said application, for a delivery status of the SMS message using said interface.

19. The non-transitory computer-readable storage medium of claim 14, further comprising instructions for:
receiving, by said application, an asynchronous delivery notification after said application has transmitted the SMS message.

20. The non-transitory computer-readable storage medium of claim 14, wherein the interface used to specify the SMS message further includes one or more of the following:
an array of addresses, a sender name, a data code schema, a binary message array, a protocol identifier, a validity period, charging information, a receipt request and a result.

* * * * *

UNITED STATES PATENT AND TRADEMARK OFFICE
CERTIFICATE OF CORRECTION

PATENT NO.        : 8,340,700 B2
APPLICATION NO.   : 12/493062
DATED             : December 25, 2012
INVENTOR(S)       : Modin Page 1 of 1

It is certified that error appears in the above-identified patent and that said Letters Patent is hereby corrected as shown below:

In the Specifications:

In column 4, line 15, delete "Base 64" and insert -- Base64 --, therefor.

Signed and Sealed this
Sixteenth Day of April, 2013

Teresa Stanek Rea
*Acting Director of the United States Patent and Trademark Office*